(12) United States Patent
Liu et al.

(10) Patent No.: US 12,456,056 B2
(45) Date of Patent: Oct. 28, 2025

(54) TRAINING METHOD AND DEVICE FOR GENERATIVE ADVERSARIAL NETWORK MODEL, EQUIPMENT, PROGRAM AND STORAGE MEDIUM

(71) Applicant: BEIJING BAIDU NETCOM SCIENCE TECHNOLOGY CO., LTD., Beijing (CN)

(72) Inventors: Hao Liu, Beijing (CN); Jindong Han, Beijing (CN); Hengshu Zhu, Beijing (CN); Dejing Dou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 996 days.

(21) Appl. No.: 17/457,903

(22) Filed: Dec. 6, 2021

(65) Prior Publication Data

US 2022/0092433 A1    Mar. 24, 2022

(30) Foreign Application Priority Data

Dec. 24, 2020  (CN) .......................... 202011547686.8

(51) Int. Cl.
*G06N 3/088* (2023.01)
*G01N 33/00* (2006.01)
(Continued)

(52) U.S. Cl.
CPC ............ *G06N 3/088* (2013.01); *G06N 3/045* (2023.01); *G01N 33/0009* (2013.01); *G01W 1/02* (2013.01)

(58) Field of Classification Search
CPC ............ G06N 20/00; G06N 3/02; G06N 3/08; G06N 3/082; G06N 3/084; G06N 3/086;
(Continued)

(56) References Cited

U.S. PATENT DOCUMENTS

2019/0302290 A1*  10/2019  Alwon ................... G01V 1/364
2020/0183032 A1*  6/2020  Liu ......................... G01V 1/282
(Continued)

FOREIGN PATENT DOCUMENTS

| CN | 110378358 A | 10/2019 |
| CN | 111586728 A | 8/2020 |
| CN | 111626490 A | 9/2020 |

OTHER PUBLICATIONS

A Comprehensive Survey on Graph Neural Networks Wu, Zonghan and Pan, Shirui and Chen, Fengwen and Long, Guodong and Zhang, Chengqi and Yu, Philip S. https://arxiv.org/abs/1901.00596 (Year: 2019).*

(Continued)

*Primary Examiner* — Matthew Ell
(74) *Attorney, Agent, or Firm* — Hunton Andrews Kurth LLP

(57) ABSTRACT

Provided are a training method and device for a heterogeneous generative adversarial network model, an equipment, a program and a storage medium. In the training method, measurement data of a heterogeneous station is acquired, the measurement data of the heterogeneous station is set as a training sample, and joint training is performed on the heterogeneous generative adversarial network model according to a total objective function. A generator is configured to predict environment data at a future occasion according to environment data of the heterogeneous station at a historical occasion so as to output predicted data. A discriminator is configured to be input the predicted data output by the generator and corresponding measurement data, and discriminate a similarity between the measurement data and the predicted data; a total objective function includes a first objective function of the generator and a second objective function of the discriminator.

19 Claims, 4 Drawing Sheets

— S201

Acquiring measurement data of a heterogeneous station

— S202

Setting the measurement data of the heterogeneous station as a training sample, and performing joint training on the heterogeneous generative adversarial network model according to a total objective function

(51) Int. Cl.
*G01W 1/02* (2006.01)
*G06N 3/045* (2023.01)

(58) Field of Classification Search
CPC ........ G06N 3/088; G06N 3/091; G06N 3/092; G06N 3/094; G06N 3/096; G06N 3/098; G06F 18/22; G06F 18/21
See application file for complete search history.

(56) References Cited

U.S. PATENT DOCUMENTS

| | | | |
|---|---|---|---|
| 2020/0183047 A1* | 6/2020 | Denli | G01V 20/00 |
| 2020/0218937 A1 | 7/2020 | Visentini Scarzanella et al. | |
| 2022/0230276 A1* | 7/2022 | Clark | G06N 3/045 |

OTHER PUBLICATIONS

Calendar Graph Neural Networks for Modeling Time Structures in Spatiotemporal User Behaviors Wang, Daheng and Jiang, Meng and Syed, Munira and Conway, Oliver and Juneja, Vishal and Subramanian, Sriram and Chawla, Nitesh V. (Year: 2020).*

Sa-kwang Song, Sung Hyon Myaeng, A novel term weighting scheme based on discrimination power obtained from past retrieval results, (Year: 2012).*

Jonathan Hui https://medium.com/data-science/gan-ways-to-improve-gan-performance-acf37f9f59b (Year: 2018).*

A conceptual similarity and correlation discrimination method based on HowNet Yunnian Ding*, Yangli Jia and Zhenling Zhang https://doi.org/10.1051/matecconf/202030903020 (Year: 2020).*

First CN search report dated May 29, 2023, issued to CN application No. 2020115476868.

Wang Jing et al., "Financial Time Serise Prediction Based On Empirical Mode Decomposition To Generate Adversarial Networks," China Academic Journal Electronic Publishing House, Computer applications and software, vol. 37 No. 5., May 12, 2020, 5 pages.

Yang Can, "Research on a deep semi-supervised model combining GAN and pseudo-tags," China Science and Technology Information, 17, date of issue Sep. 1, 2020, 6 pages.

XiuwenYi et al, "Deep Distributed Fusion Network for Air Quality Prediction," Applied Data Science Track Paper, KDD 2018, Aug. 19-23, 2018, 9 pages.

Gao Hongyi, etc., "Link Prediction Algorithm of Generative Adversarial Hierarchical Network Representation Learning," China Academic Journal Electronic Publishing House, Computer Engineering, vol. 47, No. 2, Feb. 10, 2021, 10 pages.

* cited by examiner

TRAINING METHOD AND DEVICE FOR GENERATIVE ADVERSARIAL NETWORK MODEL, EQUIPMENT, PROGRAM AND STORAGE MEDIUM

CROSS-REFERENCE TO RELATED APPLICATION(S)

This application claims priority to Chinese Patent Application No. 202011547686.8 filed Dec. 24, 2020, the disclosure of which is incorporated herein by reference in its entirety.

TECHNICAL FIELD

The present disclosure relates to the field of computer technology, in particular, to the technology of deep learning and, specifically, to a training method and device for a heterogeneous generative adversarial network model, an equipment, a program and a storage medium.

BACKGROUND

With the increasing harm of environmental pollution, people are paying more and more attention to the impact of weather and air quality on work and life. Therefore, many air quality monitoring stations and weather monitoring stations have been deployed in concerned regions, especially large cities, to monitor various indicators of the air quality and the weather separately. However, the number of the monitoring stations that are deployed is limited, thus the monitoring stations can only cover a part of regions, and cannot satisfy people's needs for knowing the air quality and weather conditions in the future. Therefore, in the related art, a solution for predicting the air quality and the weather based on data of monitoring stations is proposed. For example, a deep learning model may be used for data learning and prediction.

A related prediction model performs model training and prediction based on measurement data of a monitoring station. However, measurement errors may be introduced into the measurement data of the monitoring station due to various reasons related about the sensors and monitoring conditions of the monitoring station, so that the measurement data is not completely consistent with data of the environment. These errors are propagated and magnified in the learning process of the prediction model, which in turn affects the accuracy of the prediction model.

SUMMARY

The present disclosure provides a training method and device for a heterogeneous generative adversarial network model, an equipment, a program and a storage medium, so as to achieve joint prediction for different types of environment data performed by the heterogeneous generative adversarial network model.

In a first aspect, an embodiment of the present disclosure provides a training method for a heterogeneous generative adversarial network model, where the heterogeneous generative adversarial network model includes a generator and a discriminator, and the method includes the steps described below.

Measurement data of a heterogeneous station is acquired, where the heterogeneous station includes at least two types of stations, and each type of station among the at least two types of stations is configured to measure and obtain environment data corresponding to the each type as measurement data of the each type of station.

The measurement data of the heterogeneous station is set as a training sample, and joint training is performed on the heterogeneous generative adversarial network model according to a total objective function.

The generator is configured to predict environment data at a future occasion according to environment data of the heterogeneous station at a historical occasion so as to output predicted data.

The discriminator is configured to be input the predicted data output by the generator and corresponding measurement data, and discriminate a similarity between the measurement data and the predicted data.

The total objective function includes a first objective function of the generator and a second objective function of the discriminator.

In a second aspect, an embodiment of the present disclosure provides a training device for a heterogeneous generative adversarial network model, and the training device includes an acquisition module and a processing module.

The acquisition module is configured to acquire measurement data of a heterogeneous station, where the heterogeneous station includes at least two types of stations, and each type of station among the at least two types of stations is configured to measure and obtain environment data corresponding to the each type as measurement data of the each type of station.

The processing module is configured to set the measurement data of the heterogeneous station as a training sample, and perform joint training on the heterogeneous generative adversarial network model according to a total objective function.

The generator is configured to predict environment data at a future occasion according to environment data of the heterogeneous station at a historical occasion so as to output predicted data.

The discriminator is configured to be input the predicted data output by the generator and corresponding measurement data, and discriminate a similarity between the measurement data and the predicted data.

The total objective function comprises a first objective function of the generator and a second objective function of the discriminator.

In a third aspect, an embodiment of the present disclosure provides an electronic equipment. The electronic equipment includes: at least one processor and a memory communicatively connected to the at least one processor.

The memory stores instructions executable by the at least one processor to enable the at least one processor to execute the method of the first aspect.

In a fourth aspect, an embodiment of the present disclosure provides a computer program product. The computer program product includes a computer program which, when executed by a processor, implements the method of the first aspect.

In a fifth aspect, an embodiment of the present disclosure provides a non-transitory computer-readable storage medium storing computer instructions for causing a computer to execute the method of the first aspect.

Embodiments of the present disclosure provide a training method and device for a heterogeneous generative adversarial network model, an equipment, a program and a storage medium, which may improve the accuracy of a prediction model.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure.

DETAILED DESCRIPTION

Example embodiments of the present disclosure are described hereinafter in conjunction with the drawings, details of the embodiments of the present disclosure are included to facilitate understanding. The example embodiments are merely illustrative. Therefore, it will be appreciated by those having ordinary skill in the art that various changes and modifications may be made to the embodiments described herein without departing from the scope and spirit of the present disclosure. Similarly, description of well-known functions and constructions is omitted hereinafter for clarity and conciseness.

The embodiments of the present disclosure provide a technical solution for training a heterogeneous generative adversarial network model. The heterogeneous generative adversarial network model obtained through training may be applied to a client, such as a weather client for performing joint prediction on environmental conditions such as air quality, weather and the like.

Figure 1:
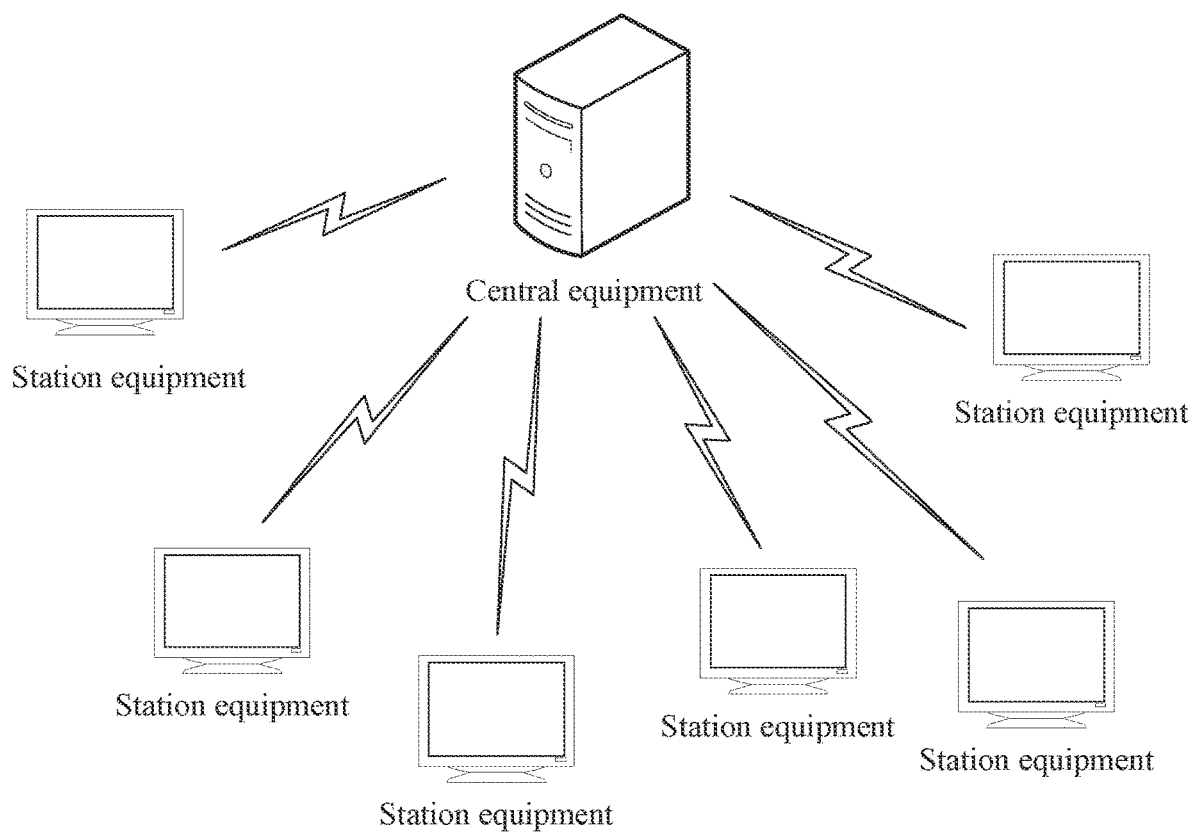
FIG. 1 is a diagram showing a training method for a heterogeneous generative adversarial network model according to an embodiment of the present disclosure.

The training method for a heterogeneous generative adversarial network model provided by the embodiment may be executed by an electronic equipment with data processing capability. Exemplarily, FIG. 1 is a diagram showing a training method for a heterogeneous generative adversarial network model according to an embodiment of the present disclosure. As shown in FIG. 1, the scene includes at least one central equipment and multiple station equipments. The central equipment is used for executing the training method for a heterogeneous generative adversarial network model provided by the embodiment of the present disclosure, and the central equipment is communicatively connected to each station equipment. The station equipments are equipments disposed at each environment monitoring station and may be weather data monitoring stations or air quality data monitoring stations. Each station equipment is configured to collect environment data corresponding to the monitoring station. Of course, the station equipment may also aggregate the collected data into a database for centralized provision to the central equipment.

Figure 2:
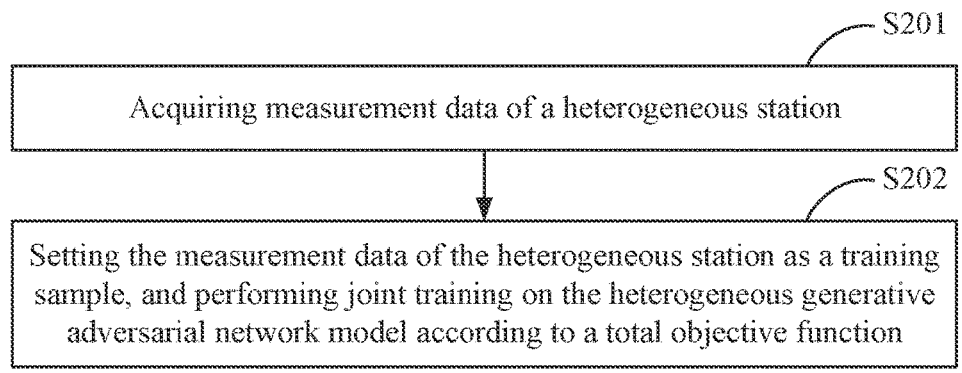
FIG. 2 is a flowchart of a training method for a heterogeneous generative adversarial network model according to an embodiment of the present disclosure.

FIG. 2 is a flowchart of a training method for a heterogeneous generative adversarial network model according to an embodiment of the present disclosure. The method of the embodiment may be executed by a training device for a heterogeneous generative adversarial network model provided by the embodiment of the present disclosure. The device may be implemented as software and/or hardware and may be integrated in any electronic equipment such as a server and an intelligence equipment. As shown in FIG. 2, the training method for a heterogeneous generative adversarial network model of the embodiment includes the steps described below.

In step S201, measurement data of a heterogeneous station is acquired.

In the step, measurement data of a heterogeneous station required for performing model training is acquired. The heterogeneous station includes at least two types of stations, and each type of station among the at least two types of stations is configured to measure and obtain environment data corresponding to the each type as measurement data of the each type of station. The measurement data refers to actual environment data measured by sensors and other devices or corresponding environment data collection methods.

Optionally, the heterogeneous station includes an air quality monitoring station and a weather monitoring station. Correspondingly, the measurement data includes weather measurement data and air quality measurement data. Exemplarily, the weather measurement data may include data of meteorological phenomena, temperature, humidity, wind speed, etc., and correspondingly may be collected or measured by the weather monitoring station. The air quality measurement data may include data of the content of various components of the air, such as smoke, PM 2.5, $SO_2$, $NO_2$, etc., and may be collected or measured by the air quality monitoring station.

It is to be understood that in the step, pre-collected measurement data of each heterogeneous station may be extracted from a database, and corresponding measurement data may be obtained from the heterogeneous station in real time.

Exemplarily, as shown in FIG. 1, the central equipment stores the measurement data reported by each station equipment through a database, and when model training is performed, the central equipment extracts the required measured data from the database of the central equipment itself.

Exemplarily, as shown in FIG. 1, each station equipment stores the measurement data of a monitoring station where the station equipment is located. When the central equipment needs to perform model training, the central equipment sends data acquisition instructions to each monitoring station, and each monitoring station sends corresponding measurement data to the central equipment according to the received data acquisition instructions.

In step S202, the measurement data of the heterogeneous station is set as a training sample, and joint training is performed on the heterogeneous generative adversarial network model according to a total objective function.

In the step, the measurement data of the heterogeneous station acquired in step S201 is set as a training sample, and joint training is performed on the heterogeneous generative adversarial network model according to a pre-constructed total objective function. Therefore, the heterogeneous generative adversarial network model obtained through training may perform joint prediction on environmental conditions such as air quality, weather and the like. Compared with the technical solution in the related art that different environmental conditions are independently predicted, the technical solution of the present disclosure may improve the processing efficiency and reduce the energy consumption.

In the embodiment, the heterogeneous generative adversarial network model includes a generator and a discriminator. The generator is configured to predict environment data at a future occasion according to environment data of the heterogeneous station at a historical occasion so as to output predicted data. The discriminator is configured to be input the predicted data output by the generator and corresponding measurement data, and discriminate a similarity between the measurement data and the predicted data. The total objective function includes a first objective function of the generator and a second objective function of the discriminator, and the second objective function includes the similarity.

Optionally, the total objective function is the sum of the first objective function of the generator and the second objective function of the discriminator, and may be expressed by a formula as:

$$L = L_g L_D$$

L represents the total objective function, $L_g$ is the first objective function of the generator, and $L_D$ is the second objective function of the discriminator.

In the embodiment, in one possible implementation, the first objective function is a loss function of the generator, and the loss function is generally a least squares loss function.

The similarity in the second objective function, that is, the similarity between the predicted data and the corresponding measurement data, is used for determining the approaching degree between the predicted data and the measurement data, and further determining the accuracy and credibility of the predicted data generated by the generator, so as to determine whether the predicted data generated by the generator can achieve the purpose of predicting the environmental conditions.

The corresponding measurement data refers to the measurement data corresponding to the predicted data. The correspondence not only includes the correspondence of the monitoring station, but also includes the correspondence of the occasion. The discriminator determines the similarity between the predicted data and the measurement data of the same monitoring station at the same occasion.

It is to be understood that the generator is connected to the discriminator and the discriminator is disposed downstream of the data of the generator, so that the data processing in the generator and the data processing in the discriminator are performed asynchronously. Exemplarily, the generator predicts the environment data at an occasion T+1 by using the environment data at an occasion T and the environment data at an occasion prior to the occasion T, obtains the predicted data at the occasion T+1, and outputs the predicted data to the discriminator. The discriminator obtains the measurement data at the occasion T+1 at the occasion T+1, and determines the similarity between the predicted data at the occasion T+1 and the measurement data at the occasion T+1.

It is to be understood that in the heterogeneous generative adversarial network model, the generator and the discriminator both have a respective independent model and model parameter, and in the embodiment, the training on the heterogeneous generative adversarial network model primarily refers to the training on the model parameter of the generator and the model parameter of the discriminator. In a possible implementation, in the embodiment, the measurement data of the heterogeneous station is set as a training sample and is input into the generator, and a model parameter in the generator is trained based on the first objective function in the total objective function; the predicted data output by the generator and the corresponding measurement data are input into the discriminator, and a model parameter in the discriminator is trained based on the second objective function in the total objective function; the model parameter of the generator is updated based on the total objective function according to a training result of the discriminator, and a next round of training is entered. The model parameter of the generator is continuously updated based on a training result of the discriminator, so that the predicted data output by the generator is getting closer and closer to the corresponding measurement data. Therefore, the effective training on the heterogeneous generative adversarial network model is achieved, and the heterogeneous generative adversarial network model finally achieves the purpose of accurately predicting the environmental conditions.

Measurement data of geographically-adjacent monitoring stations are highly correlated and interact with each other, and the correlation varies dynamically over time. For example, the distribution of points of interest (POI) in a certain region is sparse, the density is relatively small, and at the same time the wind speed is relatively large. As a result, the air quality monitoring station and weather monitoring station of this region will have a stronger correlation.

In order to show the heterogeneous space dynamic correlation and perform better joint prediction on the environmental conditions such as air quality and weather, optionally, in the embodiment, the model of the generator is constructed based on a heterogeneous station graph, nodes in the heterogeneous station graph represent stations, types of the stations at least include an air quality monitoring station and a weather monitoring stations, and edges are established between stations whose distance from each other within a set distance range.

Since monitoring stations close to each other have a relatively strong correlation, while monitoring stations far away from each other have a relatively weak correlation, exemplarily, a distance threshold (for example, 20 km) for describing a distance range may be preset according to actual conditions, edges are established between monitoring stations whose distance from each other (generally referring to the distance on the earth's surface between two monitoring stations) is less than or equal to the distance threshold, and no edge is established between monitoring stations whose distance from each other is greater than the distance threshold. That is, only the correlation between the monitoring stations whose distance from each other within the set distance range is considered, and the correlation between the monitoring stations whose distance from each other outside the set distance range is ignored, and a heterogeneous station graph is obtained.

Exemplarily, types of heterogeneous stations including an air quality monitoring station and a weather monitoring station are taken as an example, and correspondingly, the heterogeneous station graph includes four types of edges, that is, an edge from the air quality monitoring station to the air quality monitoring station, an edge from the air quality monitoring station to the weather monitoring station, an edge from the weather monitoring station to the weather monitoring station and an edge from the weather monitoring station to the air quality monitoring station. In this way, not only is the correlation between the same type of monitoring stations considered, but also the correlation between different monitoring stations is considered, so that the accuracy and reliability of the predicted data obtained by the generator is improved.

The correlation includes different levels of time and space, and in order to force the generator to predict environment data such as air quality, weather and the like from different perspectives to improve the credibility and accuracy of the predicted data, the discriminator provided by the embodiment of the present disclosure may include at least one of a space discriminator, a time discriminator or a macro discriminator.

The space discriminator is configured to be input predicted data output by the generator and corresponding measurement data of each station at a set occasion, and discriminate a space similarity between the measurement data and the predicted data at the set occasion.

The time discriminator is configured to be input predicted data output by the generator and corresponding measurement data of a set station at at least two occasions, and discriminate a time similarity between the measurement data and the predicted data of the set station.

The macro discriminator is configured to be input predicted data output by the generator and corresponding measurement data of multiple stations at multiple occasions, and discriminate a macro similarity between the predicted data and the measurement data of the generator.

The discriminator is provided with a corresponding second objective function. For ease of distinguishing, the second objective function disposed in the space discriminator is referred to as a second space objective function, the second objective function disposed in the time discriminator is referred to as a second time objective function, and the second objective function disposed in the macro discriminator is referred to as a second macro objective function.

Figure 3:
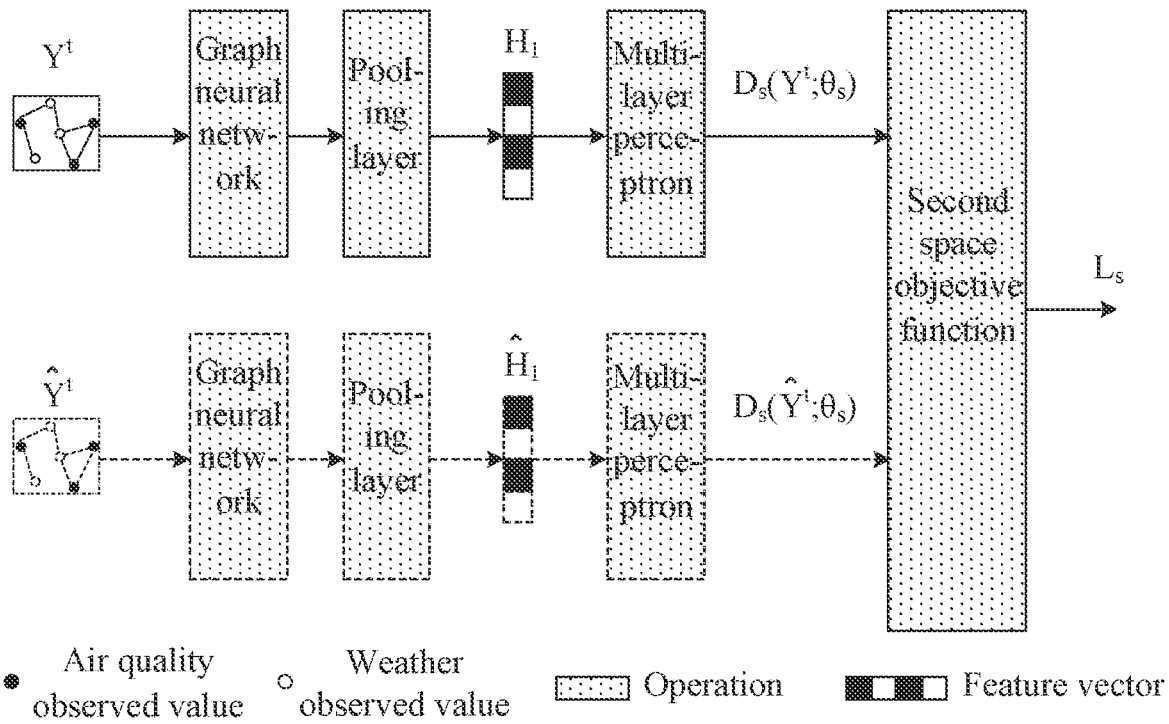
FIG. 3 is a schematic diagram of a space discriminator according to an embodiment of the present disclosure.

Exemplarily, types of heterogeneous stations including an air quality monitoring station and a weather monitoring station is taken as an example, and FIG. 3 is a schematic diagram of a space discriminator according to an embodiment of the present disclosure. As shown in FIG. 3, the space discriminator includes a graph neural network, a pooling layer and a multilayer perceptron. Input data of the space discriminator is a prediction matrix formed by predicted data of each heterogeneous station at the set occasion and a measurement matrix formed by measurement data of the each heterogeneous station at the set occasion, and the multilayer perceptron is configured to calculate a probability that the input data is the measurement data.

A second space objective function (a second objective function of the space discriminator) $L_s$ is expressed as follows:

$$L_s = \log D_s(Y^t; \theta_s) + \log(1 - D_s(\hat{Y}^t; \theta_s)) \quad (2).$$

$D_s(\ )$ is a space discriminator function, $Y^t$ is a measurement matrix, $\hat{Y}^t$ is a prediction matrix, and $\theta_s$ is a to-be-trained parameter of the space discriminator.

From the perspective of the spatial domain, one monitoring station affects the predicted data of another monitoring station having a correlation with the one monitoring station at the same occasion, which will cause accumulated errors. The purpose of setting the space discriminator is to eliminate the accumulated errors from the perspective of the spatial domain, and to force the predicted data generated by the generator to approach the measurement data from the perspective of the spatial domain, so as to improve the reliability and availability of the predicted data generated by the generator.

The measurement data or predicted data of the same monitoring station generally includes multiple items, that is, the measurement data or predicted data of each monitoring station is actually a vector. For example, a certain monitoring station is a weather monitoring station, and the corresponding measurement data or predicted data thereof may include data of weather, temperature, humidity, wind speed and the like and may be expressed as [weather, temperature, temperature, wind speed . . . ]. Therefore, in the embodiment, measurement data of all the monitoring stations at the same occasion form a measurement matrix, where each row in the measurement matrix may be a measurement data vector of one monitoring station; and predicted data of all the stations at the same occasion form a prediction matrix, where each row in the prediction matrix may be a predicted data vector of one monitoring station. The measurement matrix and the prediction matrix are respectively set as the input of the space discriminator, and the to-be-trained parameter $\theta_s$ of the space discriminator is trained through the graph neural network, the pooling layer and the multilayer perceptron and based on the second space objective function, so that the output of the second space discriminator is maximized, the purpose is finally achieved that the predicted data generated by the generator gradually approaches the measurement data, and the reliability and availability of the predicted data generated by the generator is improved.

The graph neural network may be a black box of graph convolution, which is a heterogeneous graph neural network for context aware.

The pooling layer is disposed behind the graph neural network and is used for pooling the output result of the graph neural network and obtaining a hidden layer vector of the space discriminator.

The multilayer perceptron (MLP), also referred to as the artificial neural network, is used for calculating the probability that the input data is the measurement data by classification.

It is to be understood that as shown in FIG. 3, inside the space discriminator, the space discriminator firstly calculates the probability that measurement data discriminated by the space discriminator is the measurement data and the probability that the predicted data is the measurement data through the graph neural network, the pooling layer, and the multilayer perceptron; obtains $D_s(Y^t; \theta_s)$ and $D_s(\hat{Y}^t; \theta_s)$, where $D_s(Y^t; \theta_s)$ represents the probability that the measurement data discriminated by the space discriminator is the measurement data, and $D_s(\hat{Y}^t; \theta_s)$ represents the probability that the predicted data discriminated by the space discriminator is the measurement data; and then substitutes $D_s(Y^t; \theta_s)$ and $D_s(\hat{Y}^t; \theta_s)$ into the second space objective function shown in formula (2) and obtains the space similarity $L_s$ between the measurement data and the predicted data.

Optionally, $\theta_s$ is a to-be-trained parameter matrix of the graph neural network and the multilayer perceptron in the space discriminator.

Optionally, as shown in FIG. 3, for ease of distinguishing, in the embodiment, hidden layer vectors generated in the space discriminator are respectively referred to as $H_1$ (when the input data is a measurement matrix of each heterogeneous station at a set occasion) and $\hat{H}_1$ (when the input data is a prediction matrix of each heterogeneous station at a set occasion).

Figure 4:
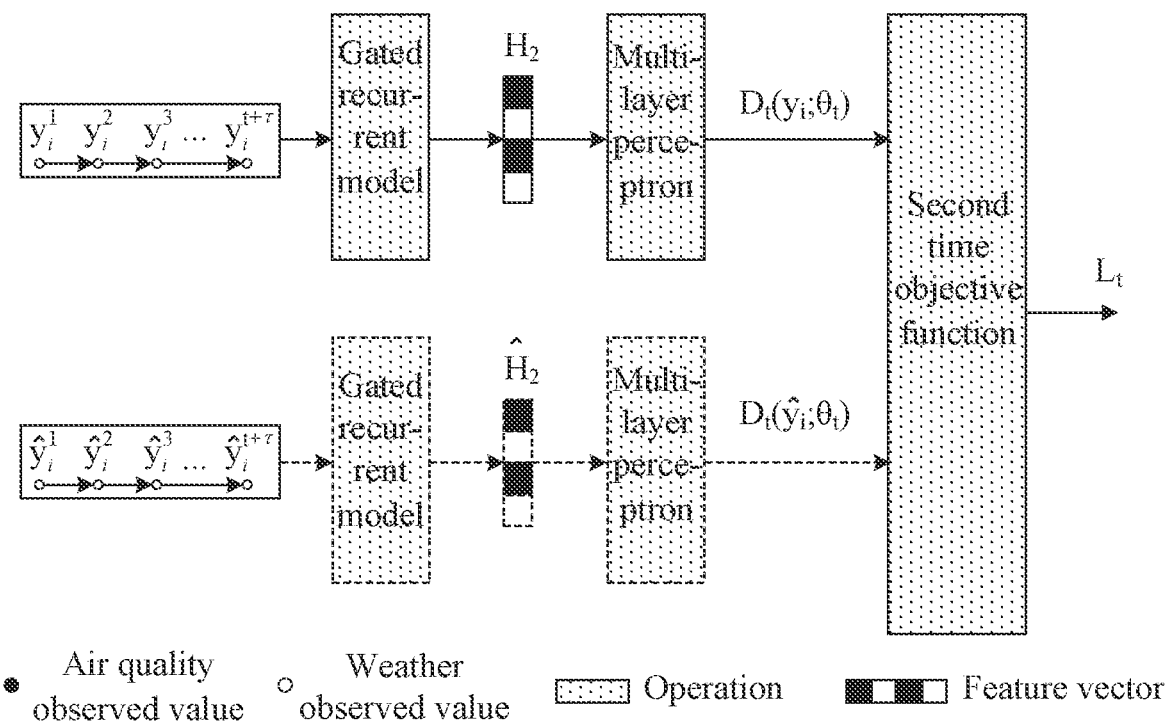
FIG. 4 is a schematic diagram of a time discriminator according to an embodiment of the present disclosure.

Exemplarily, types of heterogeneous stations including an air quality monitoring station and a weather monitoring station is taken as an example, and FIG. 4 is a schematic diagram of a time discriminator according to an embodiment of the present disclosure. As shown in FIG. 4, the time discriminator includes a gated recurrent model and a multilayer perceptron. Input data of the time discriminator is a prediction sequence formed by predicted data of a set station at multiple occasions and a measurement sequence formed by measurement data of the set station at the multiple occasions, and the multilayer perceptron is configured to calculate a probability that the input data is the measurement data.

A second time objective function (a second objective function of the time discriminator) $L_t$ is expressed as follows:

$$L_t = \log D_t(y_i; \theta_t) + \log(1 - D_t(\hat{y}_i; \theta_t)) \quad (3).$$

$D_t(\ )$ is a time discriminator function, $y_i$ is a measurement sequence, $\hat{y}_i$ is a prediction sequence, and $\theta_t$ is a to-be-trained parameter of the time discriminator.

From the perspective of the time domain, predicted data of a next time step of each station is affected by predicted data of a previous time step of the each station, which will cause accumulated errors. The purpose of setting the time discriminator is to eliminate the accumulated errors from the perspective of the time domain, and to force the predicted data generated by the generator to approach the measurement data from the perspective of the time domain, so as to improve the availability and reliability of the predicted data generated by the generator.

Since measurement data (or predicted data) at different occasions of the same monitoring station are different, in the embodiment, the measurement data of the same monitoring station at different occasions are combined to obtain a measurement sequence, and the predicted data of the same monitoring station at different occasions are combined to serve as a prediction sequence. The measurement sequence and the prediction sequence are set as the input of the time discriminator, the to-be-trained parameter $\theta_t$ of the time discriminator is trained through the gated recurrent model and the multilayer perceptron and based on the second time objective function, so that the output of the second time discriminator is maximized, the purpose is finally achieved that the predicted data generated by the generator gradually approaches the measurement data, and the reliability and availability of the predicted data generated by the generator is improved.

The gated recurrent model includes multiple gated recurrent units (GRUs). The gated recurrent unit is a common gated recurrent neural network and is used for better capturing the dependency with relatively-large time step distance in a time sequence and obtaining a hidden layer vector of the time discriminator.

The multilayer perceptron has the same function as the multilayer perceptron in the space discriminator, which is not repeated herein.

Optionally, $\theta_t$ is a to-be-trained parameter matrix of the gated recurrent model and the multilayer perceptron in the time discriminator.

It is to be understood that as shown in FIG. 4, inside the time discriminator, the time discriminator firstly calculates the probability that the measurement data discriminated by the time discriminator is the measurement data and the probability that the predicted data is the measurement data through the gated recurrent model and the multilayer perceptron; obtains $D_t(y_i; \theta_t)$ and $D_t(\hat{y}_i; \theta_t)$, where $D_t(y_i; \theta_t)$ represents the probability that the measurement data discriminated by the time discriminator is the measurement data, and $D_t(\hat{y}_i; \theta_t)$ represents the probability that the predicted data discriminated by the time discriminator is the measurement data; and then substitutes $D_t(y_i; \theta_t)$ and $D_t(\hat{y}_i; \theta_t)$ into the second time objective function shown in formula (3) and obtains the time similarity $L_t$ between the measurement data and the predicted data.

Optionally, as shown in FIG. 4, for ease of distinguishing, in the embodiment, hidden layer vectors generated in the time discriminator are respectively referred to as $H_2$ (when the input data is a measurement sequence) and $\hat{H}_z$ (when the input data is a prediction sequence).

Figure 5:
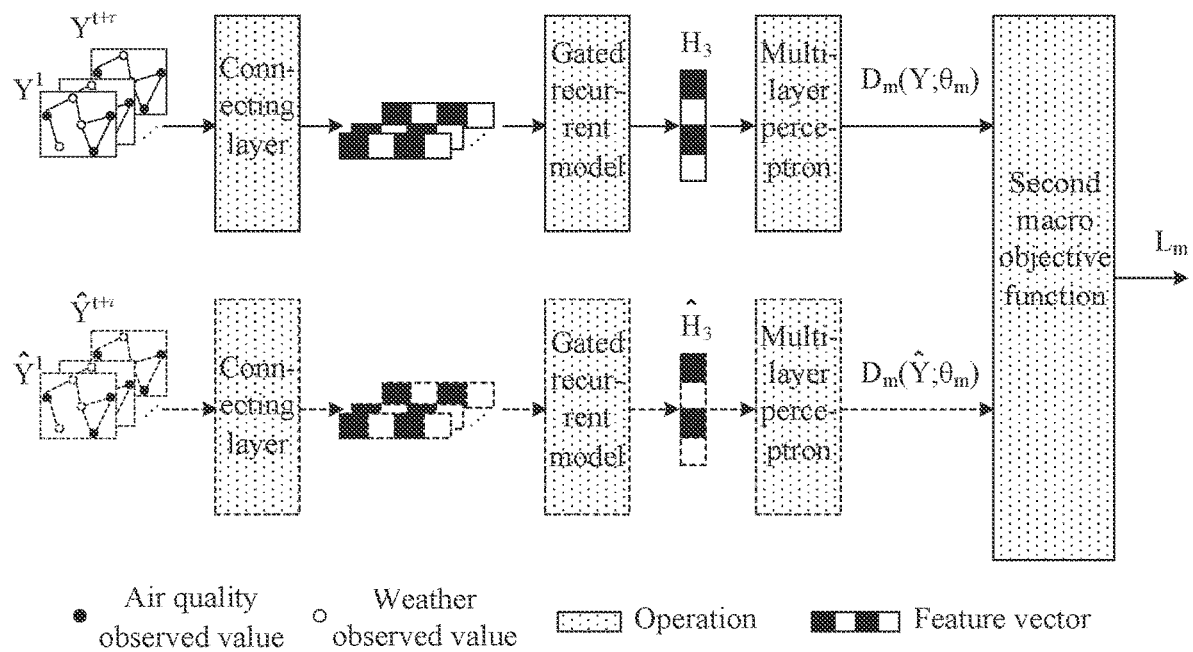
FIG. 5 is a schematic diagram of a macro discriminator according to an embodiment of the present disclosure.

Exemplarily, types of heterogeneous stations including an air quality monitoring station and a weather monitoring station is taken as an example, and FIG. 5 is a schematic diagram of a macro discriminator according to an embodiment of the present disclosure. As shown in FIG. 5, the macro discriminator includes a connecting layer, a gated recurrent model and a multilayer perceptron. Input data of the macro discriminator is a prediction matrix formed by predicted data of each heterogeneous station at multiple occasions and a measurement matrix formed by measurement data of the each heterogeneous station at the multiple occasions; the connecting layer is configured to splice a vector of each station in each matrix into an occasion vector; the multilayer perceptron is configured to calculate a probability that the input data is the measurement data.

A second macro objective function (a second objective function of the macro discriminator) $L_m$ is expressed as follows:

$$L_m = \log D_m(Y; \theta_m) + \log(1 - D_m(\hat{Y}; \theta_m)) \quad (4).$$

$D_m(\ )$ is a macro discriminator function, $Y$ is a vector of all stations at a prediction occasion, $\hat{Y}$ is a vector of the all stations at a measurement occasion, and $\theta_m$ is a to-be-trained parameter of the time discriminator.

The above space discriminator and the time discriminator force the generator to approximate the potential space distribution and time distribution of air quality and weather from a microscopic perspective (that is, considering one aspect of space or time). Further, the macroscopic discriminator is proposed to capture the global potential distribution and perform global correction of the accumulated errors, so that the purpose is achieved that the predicted data generated by the generator is forcibly to more approach the measurement data globally, and thus the availability and reliability of the predicted data generated by the generator is improved.

Different from the data input into the space discriminator or the time discriminator, the data input into the macro discriminator is the data of multiple monitoring stations at multiple occasions. From the analysis of the above space discriminator, it can be seen that the data of each heterogeneous station at the same occasion forms a matrix. In order to achieve the training on the macro discriminator according to the data of each monitoring station at multiple occasions, in the embodiment, the connecting layer is introduced into the macro discriminator, the connecting layer is configured to splice a vector of each station in each matrix into an occasion vector, and each occasion vector includes vectors of all stations which are sequentially spliced. The occasion vector is processed through the gated recurrent model and the multilayer perceptron, and the probability that the input data is the measurement data is calculated; and then a macro similarity between the predicted data generated by the generator and the measurement data is determined based on the second macro objective function.

In the embodiment, the purpose of training the to-be-trained parameter $\theta_m$ of the macro discriminator is to maximize the output of the second macro discriminator, and finally to make the predicted data generated by the generator gradually approach the measurement data and improve the reliability and availability of the predicted data generated by the generator.

The gated recurrent model and the multilayer perceptron have the same functions as the gated recurrent model and the multilayer perceptron in the time discriminator, which is not repeated herein.

Optionally, $\theta_m$ is a to-be-trained parameter matrix of the gated recurrent model and the multilayer perceptron in the macro discriminator.

It is to be understood that as shown in FIG. 5, inside the macro discriminator, measurement data and predicted data of each heterogeneous station at multiple occasions are respectively processed through the connecting layer and multiple occasion vectors of the measurement data and multiple occasion vectors of the predicted data are obtained; the probability $D_m(Y; \theta_m)$ that the measurement data discriminated by the macro discriminator is the measurement data and the probability $D_m(\hat{Y}; \theta_m)$ that the predicted data is the measurement data are calculated and obtained respectively by the gated recurrent model and the multilayer perceptron, where $D_m(Y; \theta_m)$ represents the probability that the measurement data discriminated by the macro discriminator is the measurement data, and $D_m(\hat{Y}; \theta_m)$ represents the probability that the predicted data discriminated by the macro discriminator is the measurement data; and then $D_m(Y; \theta_m)$ and $D_m(\hat{Y}; \theta_m)$ are substituted into the second macro objective function shown in formula (4) and the macro similarity $L_t$ between the measurement data and the predicted data is obtained.

Optionally, as shown in FIG. 5, for ease of distinguishing, in the embodiment, hidden layer vectors generated in the macro discriminator are respectively referred to as $H_3$ (when the input data is a measurement matrix of each heterogeneous station at multiple occasions) and $\hat{H}_Z$ (when the input data is a prediction matrix of each heterogeneous station at the multiple occasions).

It is to be understood that when the number of discriminators is greater than or equal to two, the total objective function is a weighted sum of second objective functions of multiple discriminators plus an accumulated sum of the first objective function, and is expressed by a formula as:

$$L = L_g + \Sigma_{i=1}^{K} \lambda_i L_{d_i} \tag{5}$$

L is the total objective function, $L_g$ is the first objective function of the generator, $L_{d_i}$ is a second objective function of a discriminator $d_i$, $\lambda_i$ is a weight of the discriminator $d_i$, the discriminator $d_i$ is the space discriminator, the time discriminator or the macro discriminator, and k is the number of discriminators.

It is well known that the problem of training instability and pattern collapse exists in adversarial training, during which the generator is prone to over-optimize a particular discriminator. In the embodiment, multiple discriminators are set to act together on the generator, each discriminator is configured to force the predicted data generated by the generator from a different perspective to approach the measurement data, and a weighted sum of second objective functions of the multiple discriminators plus an accumulated sum of the first objective function is set as the total objective, so that the generator has good performance in different space-time perspectives, and the accuracy of the generated predicted data is improved.

$\lambda_i$ is the weight of the discriminator $d_i$ and is used to control the importance of the discriminant loss of $L_{d_i}$ in the whole loss. In a possible implementation, the formula for calculating the weight $\lambda_i$ is expressed as follows:

$$\lambda_i = \frac{\exp(\gamma_i)}{\sum_{k=1}^{K} \exp(\gamma_k)}. \tag{6}$$

K is the number of discriminators, and the formula for calculating $\gamma_i$ is expressed as follows:

$$\gamma_i = sim(\sigma(H_i), \sigma(\hat{H}_i)) \tag{7}.$$

sim( ) is a function based on an Euclidean distance, $\sigma$ represents a sigmoid function, $H_i$ is a hidden layer vector of the discriminator $d_i$ when measurement data is input, and $\hat{H}_i$ is a hidden layer vector of the discriminator $d_i$ when predicted data is input.

From the above formula (7), it can be seen that $\gamma_i$ is used to measure the difference between $H_i$ and $\hat{H}_i$, that is, the difficulty of the discriminator $d_i$ to recognize a real sample; $\gamma_i$ is normalized by formula (6) and the weight $\lambda_i$ of the discriminator $d_i$ is obtained; and then the above formulas (6) and (7) are substituted into formula (5) to achieve the dynamic weighting of the discriminant loss, so that the generator focuses on discriminators with greater room for improvement, and better optimizes the discriminant loss and avoid over-optimizes discriminator. Therefore, it is conducive to improving the stability of multi-adversarial learning and obtaining higher prediction accuracy.

In the embodiment, measurement data of a heterogeneous station is acquired, where the heterogeneous station includes at least two types of stations, and each type of station among the at least two types of stations is configured to measure and obtain environment data corresponding to the each type as measurement data of the each type of station; the measurement data of the heterogeneous station is set as a training sample, and joint training is performed on the heterogeneous generative adversarial network model according to a total objective function. The generator is configured to predict environment data at a future occasion according to environment data of the heterogeneous station at a historical occasion so as to output predicted data; the discriminator is configured to be input the predicted data output by the generator and corresponding measurement data, and discriminate a similarity between the measurement data and the predicted data; and the total objective function includes a first objective function of the generator and a second objective function of the discriminator. Therefore, joint prediction on different types of environment data is achieved, and the accuracy of the joint prediction is improved.

Figure 6:
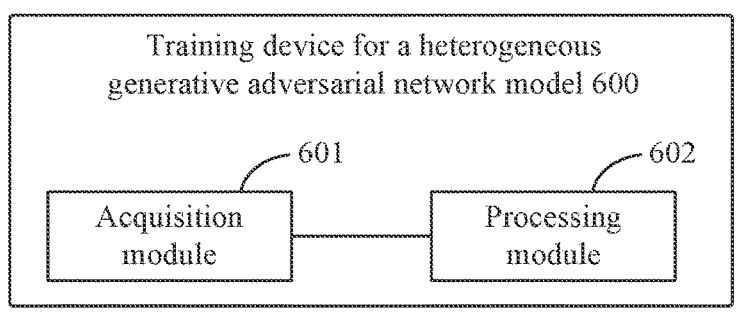
FIG. 6 is a structural diagram of a training device for a heterogeneous generative adversarial network model according to an embodiment of the present disclosure.

FIG. 6 is a structural diagram of a training device for a heterogeneous generative adversarial network model according to an embodiment of the present disclosure. The heterogeneous generative adversarial network model includes a generator and a discriminator.

As shown in FIG. 6, the training device 600 includes an acquisition module 601 and a processing module 602.

The acquisition module 601 is configured to acquire measurement data of a heterogeneous station, where the heterogeneous station includes at least two types of stations, and each type of station among the at least two types of stations is configured to measure and obtain environment data corresponding to the each type as measurement data of the each type of station.

The processing module 602 is configured to set the measurement data of the heterogeneous station as a training sample, and perform joint training on the heterogeneous generative adversarial network model according to a total objective function.

The generator is configured to predict environment data at a future occasion according to environment data of the heterogeneous station at a historical occasion so as to output predicted data.

The discriminator is configured to be input the predicted data output by the generator and corresponding measurement data, and discriminate a similarity between the measurement data and the predicted data.

The total objective function includes a first objective function of the generator and a second objective function of the discriminator.

Optionally, the discriminator includes at least one of a space discriminator, a time discriminator or a macro discriminator.

The space discriminator is configured to be input predicted data output by the generator and corresponding measurement data of each station at a set occasion, and discriminate a space similarity between the measurement data and the predicted data at the set occasion.

The time discriminator is configured to be input predicted data output by the generator and corresponding measurement data of a set station at at least two occasions, and discriminate a time similarity between the measurement data and the predicted data of the set station.

The macro discriminator is configured to be input predicted data output by the generator and corresponding measurement data of multiple stations at multiple occasions, and discriminate a macro similarity between the predicted data and the measurement data of the generator.

The discriminator is provided with the second objective function.

Optionally, the total objective function is a weighted sum of second objective functions of multiple discriminators plus an accumulated sum of the first objective function.

Optionally, the formula of the total objective function is expressed as follows:

$$L = L_g + \Sigma_{i=1}^{K} \lambda_i L_{d_i}.$$

L is the total objective function, $L_g$ is the first objective function of the generator, $L_{d_i}$ is a second objective function of a discriminator $d_i$, $\lambda_i$ is a weight of the discriminator $d_i$, the discriminator $d_i$ is the space discriminator, the time discriminator or the macro discriminator, and k is the number of discriminators.

Optionally, the space discriminator includes a graph neural network, a pooling layer and a multilayer perceptron. Input data of the space discriminator are a prediction matrix formed by predicted data of each heterogeneous station at the set occasion and a measurement matrix formed by measurement data of the each heterogeneous station at the set occasion; the multilayer perceptron is configured to calculate a probability that the input data is the measurement data.

The formula of a second objective function $L_s$ of the space discriminator is expressed as follows:

$$L_s = \log D_s(Y^t; \theta_s) + \log(1 - D_s(\hat{Y}^t; \theta_s)).$$

$D_s(\ )$ is a space discriminator function, $Y^t$ is a measurement matrix, $\hat{Y}^t$ is a prediction matrix, and $\theta_s$ is a to-be-trained parameter of the space discriminator.

Optionally, the time discriminator includes a gated recurrent model and a multilayer perceptron. Input data of the time discriminator are a prediction sequence formed by predicted data of a set station at multiple occasions and a measurement sequence formed by measurement data of the set station at the multiple occasions; the multilayer perceptron is configured to calculate a probability that the input data is the measurement data.

The formula of a second objective function $L_t$ of the time discriminator is expressed as follows:

$$L_t = \log D_t(y_i; \theta_t) + \log(1 - D_t(\hat{y}_i; \theta_t)).$$

$D_t(\ )$ is a time discriminator function, $y_i$ is a measurement sequence, $\hat{y}_i$ is a prediction sequence, and $\theta_t$ is a to-be-trained parameter of the time discriminator.

Optionally, the macro discriminator includes a connecting layer, a gated recurrent model and a multilayer perceptron. Input data of the macro discriminator are a prediction matrix formed by predicted data of each heterogeneous station at multiple occasions and a measurement matrix formed by measurement data of the each heterogeneous station at the multiple occasions; the connecting layer is configured to splice a vector of each station in each matrix into an occasion vector; the multilayer perceptron is configured to calculate a probability that the input data is the measurement data.

The formula of a second objective function $L_m$ of the macro discriminator is expressed as follows:

$$L_m = \log D_m(Y; \theta_m) + \log(1 - D_m(\hat{Y}; \theta_m)).$$

$D_m(\ )$ is a macro discriminator function, Y is a vector of all stations at a prediction occasion, $\hat{Y}$ is a vector of the all stations at a measurement occasion, and $\theta_m$ is a to-be-trained parameter of the time discriminator.

Optionally, the formula for calculating the weight A is expressed as follows:

$$\lambda_i = \frac{\exp(\gamma_i)}{\sum_{k=1}^{K} \exp(\gamma_k)}.$$

The formula for calculating $\gamma_i$ is expressed as follows:

$$\gamma_i = sim(\sigma(H_i), \sigma(\hat{H}_i)).$$

sim( ) is a function based on an Euclidean distance, $\sigma$ represents a sigmoid function, $H_i$ is a hidden layer vector of the discriminator $d_i$ when measurement data is input, and $\hat{H}_i$ is a hidden layer vector of the discriminator $d_i$ when predicted data is input.

Optionally, the model of the generator is constructed based on a heterogeneous station graph, nodes in the heterogeneous station graph represent stations, types of the stations includes an air quality monitoring station and a weather monitoring station, and edges are established between stations whose distance from each other within a set distance range.

Optionally, the processing module 602 is specifically configured to perform the steps described below.

The processing module 602 is configured to set the measurement data of the heterogeneous station as the training sample, input the training sample into the generator, and train a model parameter in the generator based on the first objective function in the total objective function.

The processing module 602 is configured to input the predicted data output by the generator and the corresponding measurement data into the discriminator, and train a model parameter in the discriminator based on the second objective function in the total objective function.

The processing module 602 is configured to update the model parameter of the generator based on the total objective function according to a training result of the discriminator, and enter a next round of training.

The training device for a heterogeneous generative adversarial network model provided by the embodiment may execute the training method for a heterogeneous generative adversarial network model provided by the above embodiments and has functional modules and beneficial effects corresponding to the executed method. The implementation principles and technical effects of the embodiment are similar to the implementation principles and technical effects of the above method embodiments, which are not repeated herein.

According to the embodiments of the present disclosure, the present disclosure further provides an electronic equipment, a readable storage medium and a computer program product.

Figure 7:
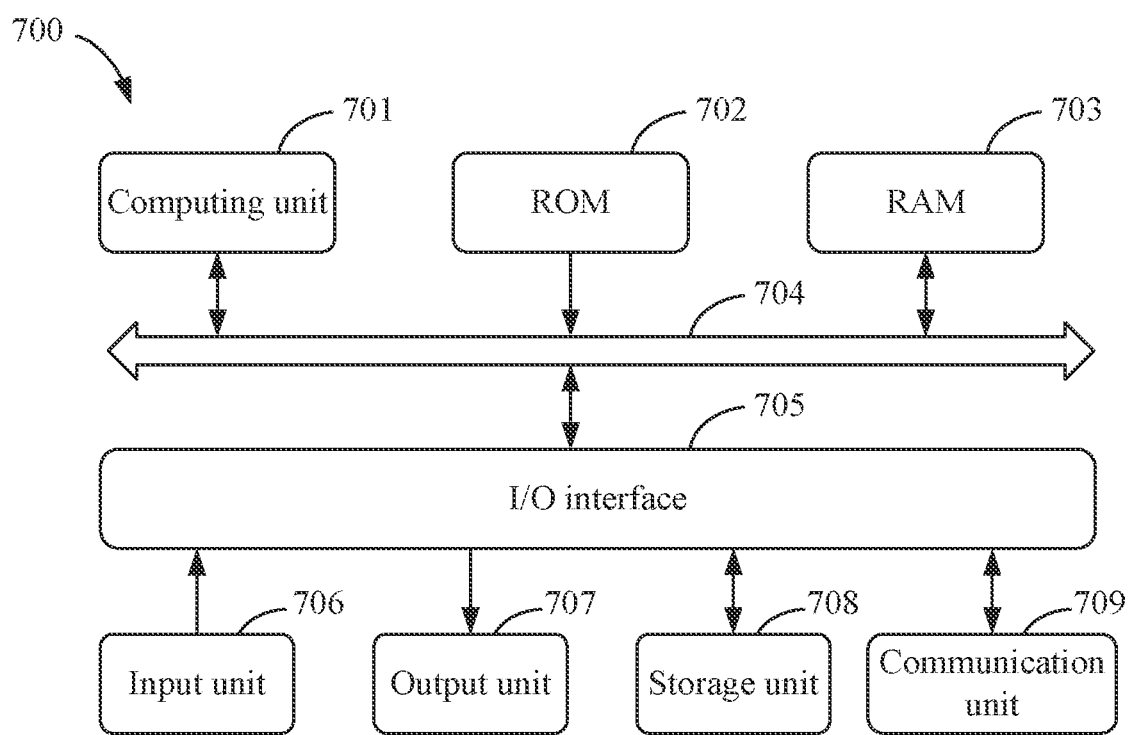
FIG. 7 is a block diagram showing an electronic equipment for implementing the training method for a heterogeneous generative adversarial network model according to an embodiment of the present disclosure.

FIG. 7 is a schematic block diagram of an electronic equipment for implementing the training method for a heterogeneous generative adversarial network model according to an embodiment of the present disclosure. As shown in FIG. 7, the electronic equipment 700 is intended to represent various forms of digital computers, for example, laptop computers, desktop computers, worktables, personal digital assistants, servers, blade servers, mainframe computers and other applicable computers. The electronic equipment may further represent various forms of mobile devices, for example, personal digital assistants, cellphones, smartphones, wearable equipments and other similar computing devices. Herein the shown components, the connections and relationships between these components, and the functions of these components are illustrative only and are not intended to limit the implementation of the present disclosure as described and/or claimed herein.

As shown in FIG. 7, the equipment 700 includes a computing unit 701. The computing unit 702 may execute various types of appropriate operations and processing based on a computer program stored in a read-only memory (ROM) 702 or a computer program loaded from a storage unit 708 to a random-access memory (RAM) 703. Various programs and data required for operations of the equipment 700 may also be stored in the RAM 703. The computing unit 701, the ROM 702 and the RAM 703 are connected to each other through a bus 704. An input/output (I/O) interface 705 is also connected to the bus 704.

Multiple components in the equipment 700 are connected to the I/O interface 705. The multiple components include an input unit 706 such as a keyboard and a mouse, an output unit 707 such as various types of displays and speakers, the storage unit 708 such as a magnetic disk and an optical disk, and a communication unit 709 such as a network card, a modem or a wireless communication transceiver. The communication unit 709 allows the equipment 700 to exchange information/data with other equipments over a computer network such as the Internet and/or various telecommunications networks.

The computing unit 701 may be various general-purpose and/or dedicated processing components having processing and computing capabilities. Some examples of the computing unit 701 include, but are not limited to, central processing units (CPUs), graphics processing units (GPUs), various dedicated artificial intelligence (AI) computing chips, various computing units running machine learning models and algorithms, digital signal processors (DSPs) and any suitable processors, controllers and microcontrollers. For example, in some embodiments, the training method for a heterogeneous generative adversarial network model may be implemented as a computer software program tangibly contained in a machine-readable medium such as the storage unit 708. In some embodiments, part or all of a computer program may be loaded and/or installed on the equipment 700 via the ROM 702 and/or the communication unit 709. When the computer program is loaded to the RAM 703 and executed by the computing unit 701, one or more steps of the training method for a heterogeneous generative adversarial network model described above may be executed. Optionally, in other embodiments, the computing unit 701 may be configured, in any other suitable manner (for example, by means of firmware), to execute the training method for a heterogeneous generative adversarial network model.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input device and at least one output device and transmitting data and instructions to the memory system, the at least one input device and the at least one output device.

Program codes for implementing the methods of the present disclosure may be compiled in any combination of one or more programming languages. These program codes may be provided for a processor or controller of a general-purpose computer, a dedicated computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, a machine-readable medium may be a tangible medium that may include or store a program that is used by or in conjunction with a system, device or equipment that executes instructions. The machine-readable medium may be a machine-readable signal medium or a machine-readable storage medium. The machine-readable medium may include, but is not limited to, electronic, magnetic, optical, electromagnetic, infrared or semiconductor systems, devices or equipments or any suitable combinations thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host, which is a host product in a cloud computing service system, so as to solve the defects of difficult management and weak business scalability in traditional physical hosts and VPS services.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, sub-combinations and substitutions may be made depending on design requirements and other factors. Any modifications, equivalent substitutions, improvements and the like made within the spirit and principle of the present disclosure are within the scope of the present disclosure.

What is claimed is:

1. A training method for a heterogeneous generative adversarial network model, executed by electronic equipment, wherein the heterogeneous generative adversarial network model comprises a generator and a discriminator, and the method comprises:

acquiring measurement data of a heterogeneous station, wherein the heterogeneous station comprises at least two types of stations, and each type of station among the at least two types of stations is configured to measure and obtain environment data corresponding to the each type as measurement data of the each type of station; and setting the measurement data of the heterogeneous station as a training sample, and performing joint training on the heterogeneous generative adversarial network model according to a total objective function;

wherein the heterogeneous station comprises an air quality monitoring station and a weather monitoring station, and the measurement data comprises weather measurement data and air quality measurement data;

wherein the generator is configured to predict environment data at a future occasion according to environment data of the heterogeneous station at a historical occasion so as to output predicted data;

the discriminator is configured to be input the predicted data output by the generator and corresponding measurement data, and discriminate a similarity between the measurement data and the predicted data; and the total objective function comprises a first objective function of the generator and a second objective function of the discriminator;

wherein the discriminator comprises at least one of:

a space discriminator, which is configured to be input predicted data output by the generator and corresponding measurement data of each station at a set occasion, and discriminate a space similarity between the measurement data and the predicted data at the set occasion;

a time discriminator, which is configured to be input predicted data output by the generator and corresponding measurement data of a set station at at least two occasions, and discriminate a time similarity between the measurement data and the predicted data of the set station; or a macro discriminator, which is configured to be input predicted data output by the generator and corresponding measurement data of a plurality of stations at multiple occasions, and discriminate a macro similarity between the predicted data and the measurement data of the generator;

wherein the discriminator is provided with the second objective function.

2. The method according to claim 1, wherein the total objective function is a weighted sum of second objective functions of a plurality of discriminators plus an accumulated sum of the first objective function.

3. The method according to claim 2, wherein a formula of the total objective function is expressed as follows:

$$L = L_g + \Sigma_{i=1}^{K} \lambda_i L_{d_i},$$

wherein L is the total objective function, $L_g$ is the first objective function of the generator, $L_{d_i}$ is a second objective function of a discriminator $d_i$, $\lambda_i$ is a weight of the discriminator $d_i$, the discriminator $d_i$ is the space discriminator, the time discriminator or the macro discriminator, and K is a number of discriminators.

4. The method according to claim 1, wherein the space discriminator comprises a graph neural network, a pooling layer and a multilayer perceptron;

input data of the space discriminator is a prediction matrix formed by predicted data of each heterogeneous station at the set occasion and a measurement matrix formed by measurement data of the each heterogeneous station at the set occasion, and the multilayer perceptron is configured to calculate a probability that the input data is the measurement data; and a formula of a second objective function $L_s$ of the space discriminator is expressed as follows:

$$L_s = \log D_s(Y^t; \theta_s) + \log(1 - D_s(\hat{Y}^t; \theta_s)),$$

wherein $D_s(\ )$ is a space discriminator function, $Y^t$ is a measurement matrix, $\hat{Y}^t$ is a prediction matrix, and $\theta_s$ is a to-be-trained parameter of the space discriminator.

5. The method according to claim 1, wherein the time discriminator comprises a gated recurrent model and a multilayer perceptron;

input data of the time discriminator is a prediction sequence formed by predicted data of a set station at a plurality of occasions and a measurement sequence formed by measurement data of the set station at the plurality of occasions, and the multilayer perceptron is configured to calculate a probability that the input data is the measurement data; and a formula of a second objective function $L_t$ of the time discriminator is as follows:

$$L_t = \log D_t(y_i; \theta_t) + \log(1 - D_t(\hat{y}_i; \theta_t)),$$

wherein $D_t(\ )$ is a time discriminator function, y; is a measurement sequence, $\hat{y}_i$ is a prediction sequence, and $\theta_t$ is a to-be-trained parameter of the time discriminator.

6. The method according to claim 1, wherein the macro discriminator comprises a connecting layer, a gated recurrent model and a multilayer perceptron;

input data of the macro discriminator is a prediction matrix formed by predicted data of each heterogeneous station at a plurality of occasions and a measurement matrix formed by measurement data of the each heterogeneous station at the plurality of occasions;

the connecting layer is configured to splice a vector of each station in each matrix into an occasion vector, and the multilayer perceptron is configured to calculate a probability that the input data is the measurement data; and a formula of a second objective function $L_m$ of the macro discriminator is expressed as follows:

$$L_m = \log D_m(Y; \theta_m) + \log(1 - D_m(\hat{Y}; \theta_m)),$$

wherein $D_m(\ )$ is a macro discriminator function, Y is a vector of all stations at a prediction occasion, $\hat{Y}$ is a vector of the all stations at a measurement occasion, and $\theta_m$ is a to-be-trained parameter of the time discriminator.

7. The method according to claim 3, wherein a formula for calculating the weight $\lambda_i$ is expressed as follows:

$$\lambda_i = \frac{\exp(\gamma_i)}{\sum_{k=1}^{K} \exp(\gamma_k)},$$

a formula for calculating $\gamma_i$ is expressed as follows:

$$\gamma_i = \text{sim}(\sigma(H_i), \sigma(\hat{H}_i)),$$

wherein sim( ) is a function based on an Euclidean distance, σ represents a sigmoid function, $H_i$ is a hidden layer vector of the discriminator $d_i$ when measurement data is input, and $\hat{H}_i$ is a hidden layer vector of the discriminator $d_i$ when predicted data is input.

8. The method according to claim 1, wherein the model of the generator is constructed based on a heterogeneous station graph, nodes in the heterogeneous station graph represent stations, types of the stations comprise an air quality monitoring station and a weather monitoring station, and edges are established between stations whose distance from each other is within a set distance range.

9. The method according to claim 1, wherein the setting the measurement data of the heterogeneous station as the training sample, and performing the joint training on the heterogeneous generative adversarial network model based on the total objective function comprises:

setting the measurement data of the heterogeneous station as the training sample, inputting the training sample into the generator, and training a model parameter in the generator based on the first objective function in the total objective function;

inputting the predicted data output by the generator and the corresponding measurement data into the discriminator, and training a model parameter in the discriminator based on the second objective function in the total objective function; and updating the model parameter of the generator based on the total objective function according to a training result of the discriminator, and entering a next round of training.

10. An electronic equipment, comprising:

at least one processor; and a memory communicatively connected to the at least one processor; wherein the memory stores instructions executable by the at least one processor to enable the at least one processor to perform a training method for a heterogeneous generative adversarial network model, wherein the heterogeneous generative adversarial network model comprises a generator and a discriminator, and the method comprises:

acquiring measurement data of a heterogeneous station, wherein the heterogeneous station comprises at least two types of stations, and each type of station among the at least two types of stations is configured to measure and obtain environment data corresponding to the each type as measurement data of the each type of station; and setting the measurement data of the heterogeneous station as a training sample, and performing joint training on the heterogeneous generative adversarial network model according to a total objective function;

wherein the heterogeneous station comprises an air quality monitoring station and a weather monitoring station, and the measurement data comprises weather measurement data and air quality measurement data;

wherein the generator is configured to predict environment data at a future occasion according to environment data of the heterogeneous station at a historical occasion so as to output predicted data;

the discriminator is configured to be input the predicted data output by the generator and corresponding measurement data, and discriminate a similarity between the measurement data and the predicted data; and the total objective function comprises a first objective function of the generator and a second objective function of the discriminator;

wherein the discriminator comprises at least one of:

a space discriminator, which is configured to be input predicted data output by the generator and corresponding measurement data of each station at a set occasion, and discriminate a space similarity between the measurement data and the predicted data at the set occasion;

a time discriminator, which is configured to be input predicted data output by the generator and corresponding measurement data of a set station at at least two occasions, and discriminate a time similarity between the measurement data and the predicted data of the set station; or a macro discriminator, which is configured to be input predicted data output by the generator and corresponding measurement data of a plurality of stations at multiple occasions, and discriminate a macro similarity between the predicted data and the measurement data of the generator;

wherein the discriminator is provided with the second objective function.

11. The electronic equipment according to claim 10, wherein the total objective function is a weighted sum of second objective functions of a plurality of discriminators plus an accumulated sum of the first objective function.

12. The electronic equipment according to claim 11, wherein a formula of the total objective function is expressed as follows:

$$L=L_g+\sum_{i=1}^{K}\lambda_i L_{d_i},$$

wherein L is the total objective function, $L_g$ is the first objective function of the generator, $L_{d_i}$ is a second objective function of a discriminator $d_i$, $\lambda_i$ is a weight of the discriminator $d_i$, the discriminator $d_i$ is the space discriminator, the time discriminator or the macro discriminator, and K is a number of discriminators.

13. The electronic equipment according to claim 10, wherein the space discriminator comprises a graph neural network, a pooling layer and a multilayer perceptron;

input data of the space discriminator is a prediction matrix formed by predicted data of each heterogeneous station at the set occasion and a measurement matrix formed by measurement data of the each heterogeneous station at the set occasion, and the multilayer perceptron is configured to calculate a probability that the input data is the measurement data; and a formula of a second objective function $L_s$ of the space discriminator is expressed as follows:

$$L_s=\log D_s(Y^t;\theta_s)+\log(1-D_s(\hat{Y}^t;\theta_s)),$$

wherein $D_s(\ )$ is a space discriminator function, $Y^t$ is a measurement matrix, $\hat{Y}^t$ is a prediction matrix, and $\theta_s$ is a to-be-trained parameter of the space discriminator.

14. The electronic equipment according to claim 10, wherein the time discriminator comprises a gated recurrent model and a multilayer perceptron;

input data of the time discriminator is a prediction sequence formed by predicted data of a set station at a plurality of occasions and a measurement sequence formed by measurement data of the set station at the plurality of occasions, and the multilayer perceptron is configured to calculate a probability that the input data is the measurement data; and a formula of a second objective function $L_t$ of the time discriminator is as follows:

$$L_t=\log D_t(y_i;\theta_t)+\log(1-D_t(\hat{y}_i;\theta_t)),$$

wherein $D_t(\ )$ is a time discriminator function, $y_i$ is a measurement sequence, $\hat{y}_i$ is a prediction sequence, and $\theta_t$ is a to-be-trained parameter of the time discriminator.

15. The electronic equipment according to claim 10, wherein the macro discriminator comprises a connecting layer, a gated recurrent model and a multilayer perceptron;

input data of the macro discriminator is a prediction matrix formed by predicted data of each heterogeneous station at a plurality of occasions and a measurement matrix formed by measurement data of the each heterogeneous station at the plurality of occasions;

the connecting layer is configured to splice a vector of each station in each matrix into an occasion vector, and the multilayer perceptron is configured to calculate a probability that the input data is the measurement data; and a formula of a second objective function $L_m$ of the macro discriminator is expressed as follows:

$$L_m=\log D_m(Y;\theta_m)+\log(1-D_m(\hat{Y};\theta_m)),$$

wherein $D_m(\ )$ is a macro discriminator function, Y is a vector of all stations at a prediction occasion, $\hat{Y}$ is a vector of the all stations at a measurement occasion, and $\theta_m$ is a to-be-trained parameter of the time discriminator.

16. The electronic equipment according to claim 12, wherein a formula for calculating the weight $\lambda_i$ is expressed as follows:

$$\lambda_i = \frac{\exp(\gamma_i)}{\sum_{k=1}^{K}\exp(\gamma_k)},$$

a formula for calculating $\gamma_i$ is expressed as follows:

$$\gamma_i = \text{sim}(\sigma(H_i), \sigma(\hat{H}_i)),$$

wherein sim( ) is a function based on an Euclidean distance, σ represents a sigmoid function, $H_i$ is a hidden layer vector of the discriminator $d_i$ when measurement data is input, and $\hat{H}_i$ is a hidden layer vector of the discriminator $d_i$ when predicted data is input.

17. The electronic equipment according to claim 10, wherein the model of the generator is constructed based on a heterogeneous station graph, nodes in the heterogeneous station graph represent stations, types of the stations comprise an air quality monitoring station and a weather monitoring station, and edges are established between stations whose distance from each other is within a set distance range.

18. The electronic equipment according to claim 10, wherein the setting the measurement data of the heterogeneous station as the training sample, and performing the joint training on the heterogeneous generative adversarial network model based on the total objective function comprises:

setting the measurement data of the heterogeneous station as the training sample, inputting the training sample into the generator, and training a model parameter in the generator based on the first objective function in the total objective function;

inputting the predicted data output by the generator and the corresponding measurement data into the discriminator, and training a model parameter in the discriminator based on the second objective function in the total objective function; and updating the model parameter of the generator based on the total objective function according to a training result of the discriminator, and entering a next round of training.

19. A non-transitory computer-readable storage medium storing computer instructions for causing a computer to perform a training method for a heterogeneous generative adversarial network model, wherein the heterogeneous generative adversarial network model comprises a generator and a discriminator, and the method comprises:

acquiring measurement data of a heterogeneous station, wherein the heterogeneous station comprises at least two types of stations, and each type of station among the at least two types of stations is configured to measure and obtain environment data corresponding to the each type as measurement data of the each type of station; and setting the measurement data of the heterogeneous station as a training sample, and performing joint training on the heterogeneous generative adversarial network model according to a total objective function;

wherein the heterogeneous station comprises an air quality monitoring station and a weather monitoring station, and the measurement data comprises weather measurement data and air quality measurement data;

wherein the generator is configured to predict environment data at a future occasion according to environment data of the heterogeneous station at a historical occasion so as to output predicted data;

the discriminator is configured to be input the predicted data output by the generator and corresponding measurement data, and discriminate a similarity between the measurement data and the predicted data; and the total objective function comprises a first objective function of the generator and a second objective function of the discriminator;

wherein the discriminator comprises at least one of:

a space discriminator, which is configured to be input predicted data output by the generator and corresponding measurement data of each station at a set occasion, and discriminate a space similarity between the measurement data and the predicted data at the set occasion;

a time discriminator, which is configured to be input predicted data output by the generator and corresponding measurement data of a set station at at least two occasions, and discriminate a time similarity between the measurement data and the predicted data of the set station; or a macro discriminator, which is configured to be input predicted data output by the generator and corresponding measurement data of a plurality of stations at multiple occasions, and discriminate a macro similarity between the predicted data and the measurement data of the generator;

wherein the discriminator is provided with the second objective function.

* * * * *